US006466769B1

(12) United States Patent
Kobayashi et al.

(10) Patent No.: US 6,466,769 B1
(45) Date of Patent: Oct. 15, 2002

(54) MOUNTING STRUCTURE OF KEY PRESSING DEVICE

(75) Inventors: Tsuyoshi Kobayashi, Tokyo; Kanta Judai, Kanagawa, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/447,167

(22) Filed: Nov. 22, 1999

(30) Foreign Application Priority Data

Nov. 27, 1998 (JP) .......................................... 10-337054

(51) Int. Cl.[7] ................................................ H04B 1/38

(52) U.S. Cl. .................................... 455/90; 379/433.01

(58) Field of Search .......................... 455/90, 550, 575, 455/433.06, 433.13; 379/433.01, 446, 447, 425, 424, 454, 455; D14/138, 146, 240

(56) References Cited

U.S. PATENT DOCUMENTS

| | | | | |
|---|---|---|---|---|
| 4,895,326 A | * | 1/1990 | Nimpoeno et al. | 248/27.1 |
| 5,041,870 A | * | 8/1991 | Imai et al. | 335/83 |
| 5,471,653 A | * | 11/1995 | Nagai | 455/90 |
| 5,642,404 A | * | 6/1997 | Hsu | 455/550 |
| 6,085,113 A | * | 7/2000 | Fan | 455/569 |
| 6,101,372 A | * | 8/2000 | Kubo | 455/90 |
| 6,148,183 A | * | 11/2000 | Higdon et al. | 455/90 |

* cited by examiner

*Primary Examiner*—Dwayne Bost
*Assistant Examiner*—Joy K. Contee
(74) *Attorney, Agent, or Firm*—Pearne & Gordon LLP

(57) ABSTRACT

A key pressing device is formed of an elastic member in a generally L-shape, and an engagement claw is formed on a bottom wall portion of the elastic member, and a hinge is formed on upstanding leg portions of the elastic member, and a key button is formed on the hinge. A case to which the key pressing device it mounted, includes an engagement portion for receiving the engagement claw of the key pressing device, mounting base portions and stoppers, and a hole for receiving the key button. The engagement claw of the key pressing device is brought into engagement in the engagement portion on the case while inserting the key button into the hole, thereby effecting a mounting operation.

10 Claims, 3 Drawing Sheets

MOUNTING STRUCTURE OF KEY PRESSING DEVICE

BACKGROUND OF THE PRESENT INVENTION

This invention relates to a mounting structure of a key pressing device in a radio communication equipment such as a portable telephone and a PHS (personal handy phone system), and more particularly to such a structure in which the key pressing device can be easily mounted on mounting base portions formed on a casing.

FIGS. 5 and 6 show a conventional key pressing device in a radio communication equipment such as a portable telephone and a PHS. In FIG. 5, bosses 52 for passing respectively through mounting holes 55 in the key pressing device 54 are formed upright on a casing 51, and after the mounting holes 55 in the key pressing device 54 are fitted respectively on the bosses 52, the bosses 52 are fused to be fixedly secured to the key pressing device.

FIG. 6 shows the construction of the key pressing device 54, and this device 54 is formed into a generally L-shape as a whole, and a hinge 57 is formed on upstanding leg portions 56 thereof, and a key button 58 is formed on a front surface of the hinge 57 in a projected manner. Therefore, in a key pressing operation, when the key button 58 is pressed, one end of the hinge 57 is brought into engagement with a switch (not shown) to operate this switch.

Only a lower half of the casing 51 is shown, and the showing of an upper half thereof for mounted on the lower half is omitted. A notch 53 is formed in the casing 51, and the key button 58 projects outwardly through this notch.

However, in the conventional key pressing device-mounting structure in a portable radio communication equipment, the bosses on the casing must be fused to the key pressing device after the mounting holes in the key pressing device are fitted respectively on the bosses. Thus, there has been encountered a problem that the fusion step, which is cumbersome, must be effected in the mounting operation.

SUMMARY OF THE INVENTION

It is therefore an object of this invention to provide a mounting structure of a key pressing device in which a key pressing device can be easily mounted on mounting base portions formed on a casing.

The above problem has been solved by a mounting structure of a key pressing device in that a key pressing device comprises an elastic member of a generally L-shape, and an engagement claw is formed on a bottom wall portion of the elastic member, and a hinge is formed on upstanding leg portions of the elastic member, and a key button is formed on the hinge, and an engagement portion for receiving the engagement claw of the key pressing device, mounting base portions and stoppers are formed on a casing, and a hole for receiving the key button is formed in the casing, and the engagement claw of the key pressing device is brought into engagement in the engagement portion on the casing while inserting the key button into the hole, thereby effecting a mounting operation.

With this construction, there is achieved an advantage that the key pressing device can be easily mounted on the mounting base portions formed on the casing.

DETAILED DESCRIPTION OF THE PREFERRED EMBODIMENTS

Figure 1:
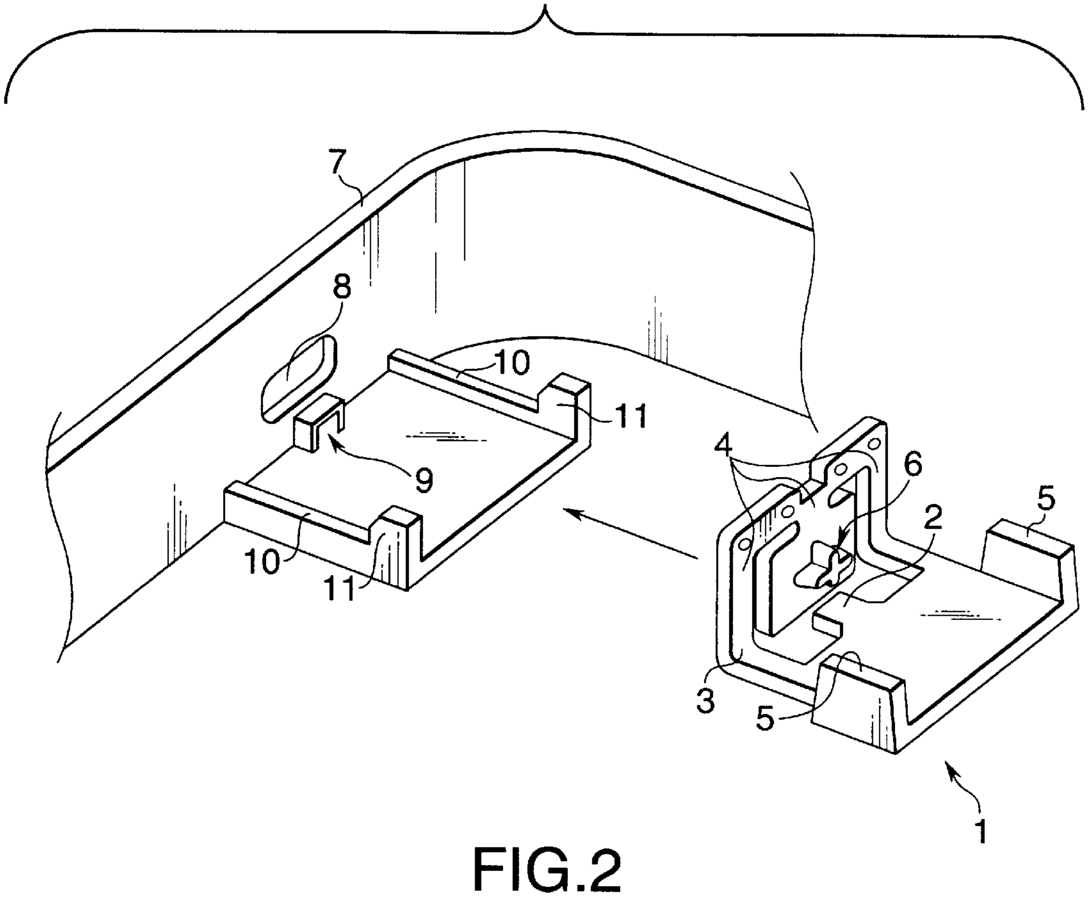
FIG. 1 is a perspective view showing a key pressing device-mounting structure in a radio communication equipment such as a portable telephone and a PHS.

A preferred embodiment of the present invention will now be described with reference to the drawing.

FIG. 1 is a perspective view showing a key pressing device-mounting structure in a radio communication equipment such as a portable telephone and a PHS. In FIG. 1, the key pressing device 1 is formed of an elastic member (e.g. ABS resin) in a generally L-shape. A hinge 4 is formed on upstanding leg portions 3 of the elastic member, and an engagement claw 2 is formed on a bottom wall portion of the elastic member. A key button is formed on the hinge 4, and a boss is formed on the reverse side of this key button. Printed circuit board-supporting portions 5 are formed in opposed relation to the upstanding leg portions 3, respectively. Referring to the positional relation between the key button and the engagement claw 2, the engagement claw 2 is formed centrally of the width of the bottom wall portion, and the key button is formed on the hinge 4 in such a manner that the center of the key button is disposed centrally of the width of the engagement claw 2.

A hole 8 for receiving the key button is formed through a casing 7, and mounting base portions 10 and stoppers 11 are formed upright on the casing, and an engagement portion 9 for receiving the engagement claw 2 is formed on the casing. Referring to the positional relation between the hole 8 and the engagement portion 9, the engagement portion 9 is disposed centrally of the width of the hole 8.

In the above example, although the key button is inserted into the key button insertion hole, there may be used an arrangement in which a notch is formed in the casing 7 as in the conventional construction, and the key button is received in this notch.

Figure 2:
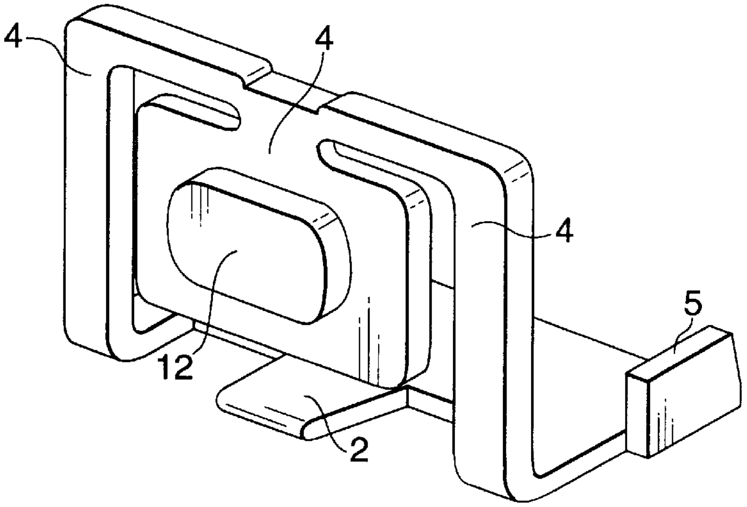
FIG. 2 is a perspective view of the key pressing device of FIG. 1 as seen from another side.

FIG. 2 is a perspective view of the key pressing device 1 of FIG. 1 as seen from another side. It will be appreciated from FIG. 2 that the key button 12 is formed on the hinge 4. The other construction is as described above with reference to FIG. 1, and therefore explanation thereof will be omitted here.

Figure 3:
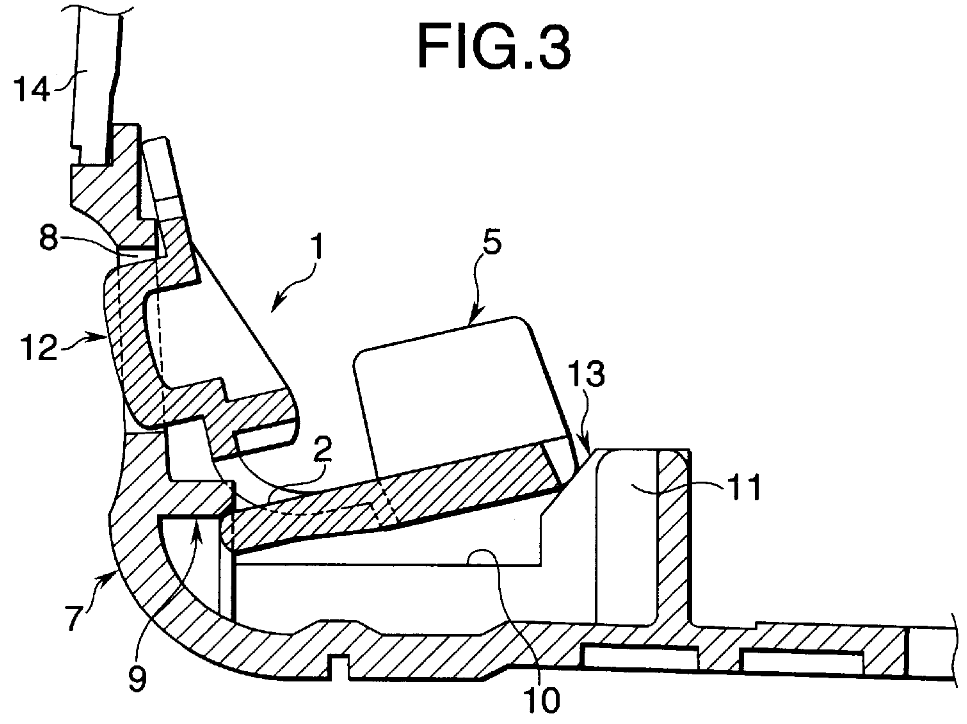
FIG. 3 is a cross-sectional view of the key pressing device-mounting structure of the invention in a radio communication equipment (such as a portable telephone and a PHS) showing a mounting operation.

FIG. 3 is a cross-sectional view of the key pressing device-mounting structure of the invention in a radio communication equipment (such as a portable telephone and a PHS), showing the mounting operation. FIG. 3 shows a condition immediately before the engagement claw 2 of the key pressing device 1 becomes engaged in the engagement portion of the casing 7, and at this time the key button 12 is in the process of reception in the hole in the casing 7. Thereafter, the lower sides of the printed circuit board-supporting portions 5 are slid down over slanting surfaces 13 of the stoppers 11, respectively, so that the key pressing device 1 is fixed to the mounting base portions 10. Part of a cover 14 for engagement with the casing 7 is shown in this Figure.

Figure 4:
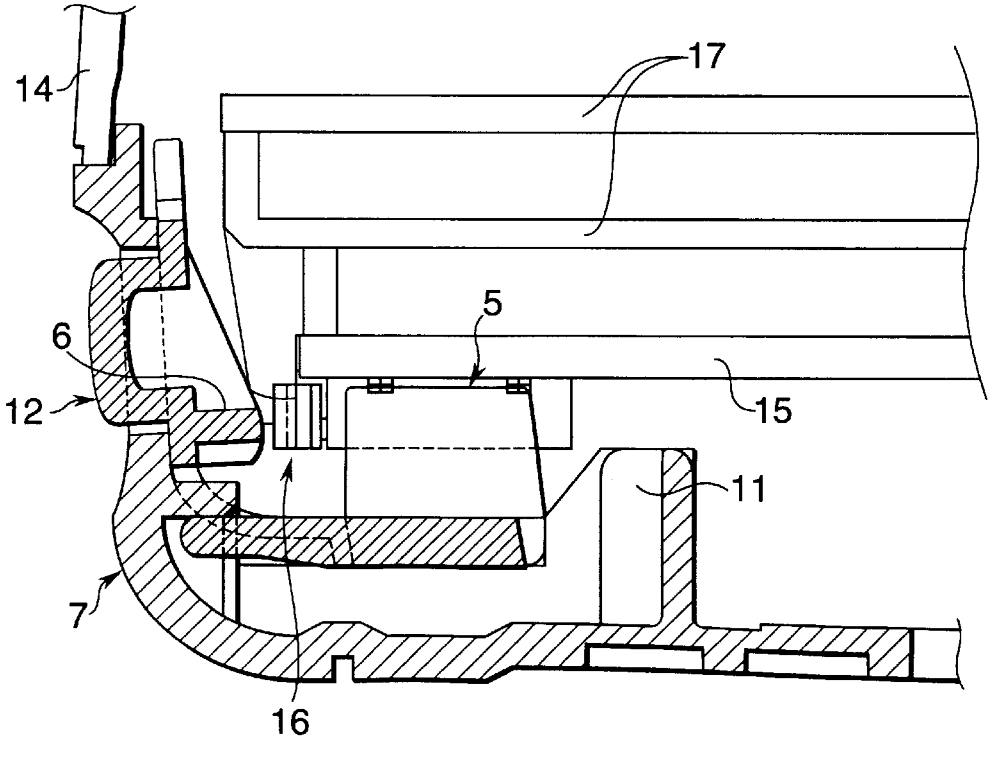
FIG. 4 is a cross-sectional view of the key pressing device-mounting structure of the invention in a radio communication equipment (such as a portable telephone and a PHS), showing a condition in which the mounting operation is completed.
Figure 5:
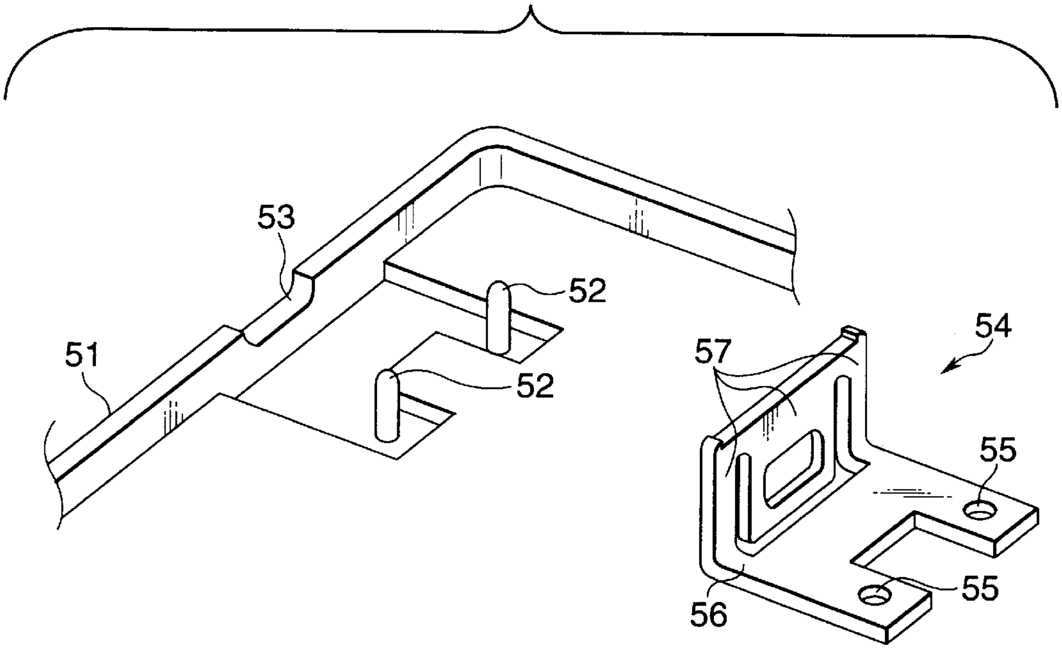
FIG. 5 is a perspective view showing the construction of a conventional key pressing device-mounting structure.
Figure 6:
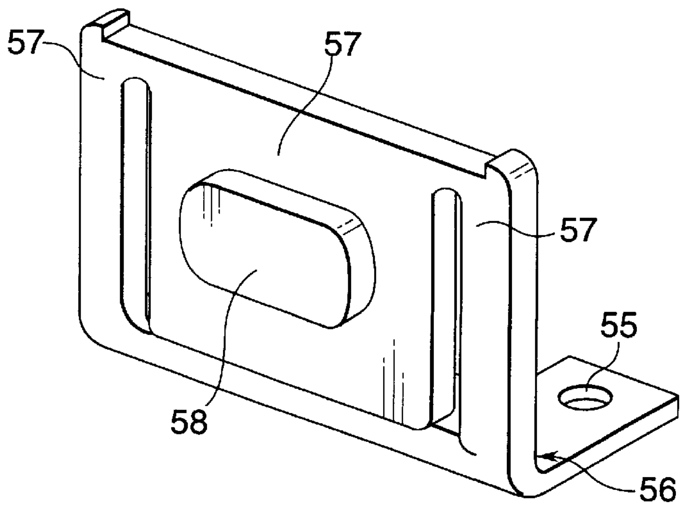
FIG. 6 is a perspective view of the conventional key pressing device-mounting structure as seen from another side.

FIG. 4 is a cross-sectional view of the key pressing device-mounting structure of the invention in a radio communication equipment (such as a portable telephone and a PHS), showing a condition in which the mounting operation is completed. In FIG. 4, the engagement of the key pressing device 1 has already been completed, and this key pressing device 1 is completely placed on the mounting base portions 10, and in this condition a printed circuit board 15 is placed on the printed circuit board-supporting portions 5. A switch member 16, mounted on an associated member 17, is disposed in opposed relation to a pressing portion 6 formed on the reverse surface of the key pressing device 1.

In FIG. 4, when the key button 12 of the key pressing device 1 is pressed, the pressing portion 6, formed on the reverse surface of the key pressing portion 1, is pressed against the switch member 16 through the hinge to thereby operate the switch member 16. At this time, since the key pressing device 1 is completely mounted on the mounting base portions 10, the stoppers 11 function to hold the key pressing device 1 against displacement out of position upon pressing of the key button 12, and besides the hinge properties are fully derived. The hinge properties are such that when the key button 12 is not pressed, the hinge is urged in a direction toward the outside of the casing 7, and therefore during transport of the product, the key pressing device will not shake, and also any vibration sound will not be produced.

Although the engagement claw 2 is formed centrally of the width of the bottom wall portion while the engagement portion 9 is disposed centrally of the width of the hole 8, each of the engagement claw and the engagement portion can be provided at other portion than such widthwise-central portion in so far as the two can be suitably engaged with each other.

In the present invention, the misalignment of the key button 12 relative to the hole 8 can be easily corrected by adjusting molds for the engagement claw 2 and the engagement portion 9, so that a gap between the key button 12 and the hole 8 is made uniform, thus achieving the effect of enhancing the appearance.

As is clear from the foregoing description, in the key pressing device-mounting structure of the present invention, the key pressing device comprises the elastic member of a generally L-shape, and the engagement claw is formed on the bottom wall portion of the elastic member, and the hinge is formed on the upstanding leg portions of the elastic member, and the key button is formed on the hinge, and the engagement portion for receiving the engagement claw of the key pressing device, the mounting base portions and the stoppers are formed on the casing, and the hole for receiving the key button is formed in the casing, and the engagement claw of the key pressing device is brought into engagement in the engagement portion on the casing while inserting the key button into the hole, thereby effecting the mounting operation. With this construction, there is achieved an advantage that the key pressing device can be easily mounted on the mounting base portions formed on the casing.

What is claimed is:

1. A mounting structure of a key pressing device comprising:

a key pressing device formed of an elastic member comprising a bottom wall portion and upstanding legs arranged in a generally L-shape, said key pressing device including an engagement claw formed on the bottom wall portion, a hinge formed on the upstanding leg portions, and a key button formed on said hinge; and a case to which said key pressing device is mounted, including an engagement portion for receiving said engagement claw of said key pressing device, mounting base portions and stoppers formed on said case, and a hole for receiving said key button formed in said case, wherein said engagement claw of said key pressing device is brought into engagement in said engagement portion on said casing while inserting said key button into said hole, thereby effecting a mounting operation.

2. A mounting structure according to claim 1, wherein supporting portions for supporting a printed circuit board are formed in opposed relation to said upstanding leg portions, respectively.

3. A mounting structure according to claim 1, wherein a pressing portion for pressing against a switch is formed on that side of said key pressing device facing away from said key button.

4. A mounting structure according to claim 1, wherein a slanting surface is formed on that portion of an upper surface of each stopper disposed adjacent to the corresponding mounting base portion.

5. A mounting structure according to claim 3, wherein said key pressing device is made of an ABS resin, and said engagement claw, said hinge, said printed circuit board-supporting portions and said pressing portion are formed integrally with one another by molding.

6. A portable radio telephone comprising:

a key pressing device formed of an elastic member comprising a bottom wall portion and upstanding legs arranged in a generally L-shape, said key pressing device including an engagement claw formed on the bottom wall portion, a hinge formed on the upstanding leg portions, and a key button formed on said hinge; and a case to which said key pressing device is mounted, including an engagement portion for receiving said engagement claw of said key pressing device, mounting base portions and stoppers formed on said case, and a hole for receiving said key button formed in said case, wherein said engagement claw of said key pressing device is brought into engagement in said engagement portion on said casing while inserting said key button into said hole, thereby effecting a mounting operation.

7. A portable radio device according to claim 6, wherein supporting portions for supporting a printed circuit board are formed in opposed relation to said upstanding leg portions, respectively.

8. A portable radio device according to claim 6, wherein a pressing portion for pressing against a switch is formed on that side of said key pressing device facing away from said key button.

9. A portable radio device according to claim 6, wherein a slanting surface is formed on that portion of an upper surface of each stopper disposed adjacent to the corresponding mounting base portion.

10. A portable radio device according to claim 8, wherein said key pressing device is made of an ABS resin, and said engagement claw, said hinge, said printed circuit board-supporting portions and said pressing portion are formed integrally with one another by molding.

* * * * *